United States Patent
Kato (10) Patent No.: US 6,739,557 B2
(45) Date of Patent: May 25, 2004

(54) MUFFLER HANGER

(75) Inventor: Kazuhiko Kato, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/375,350

(22) Filed: Feb. 28, 2003

(65) Prior Publication Data

US 2003/0160136 A1 Aug. 28, 2003

(30) Foreign Application Priority Data

Feb. 28, 2002 (JP) ........................................ 2002-053643

(51) Int. Cl.⁷ .................................................. F16L 3/00
(52) U.S. Cl. ........................ 248/58; 181/309; 248/610; 248/613
(58) Field of Search ............................. 248/58, 62, 65, 248/544, 609, 610, 613; 180/309; 181/208

(56) References Cited

U.S. PATENT DOCUMENTS

| 4,550,795 A | * | 11/1985 | Teshima | ........................ | 180/296 |
| 4,660,797 A | * | 4/1987 | Tonnies | ........................ | 248/610 |
| 6,402,119 B1 | * | 6/2002 | Miska | ........................ | 248/613 |

FOREIGN PATENT DOCUMENTS

| EP | 529250 A1 | * | 3/1993 | ................. | 180/309 |
| JP | 59-83273 | | 6/1984 | | |
| JP | 64-44318 | | 3/1989 | | |
| JP | 2-35921 | | 3/1990 | | |
| JP | 2-143324 | | 12/1990 | | |
| JP | 3-97524 | | 10/1991 | | |
| JP | 2706882 | | 1/1998 | | |
| JP | 2001-182779 | | 7/2001 | | |
| JP | 2001-328441 | | 11/2001 | | |

* cited by examiner

Primary Examiner—Ramon O Ramirez
(74) Attorney, Agent, or Firm—Oblon, Spivak, McClelland, Maier & Neustadt, P.C.

(57) ABSTRACT

A muffler hanger includes a metallic body member, an elastic rubber mounting portion, a pair of elastic rubber supporting portions, and an elastic rubber connection portion. The metallic body member includes a bottom plate and a pair of side plates and assumes a U-like shape. The elastic rubber mounting portion is disposed within the metallic body member. The paired elastic rubber supporting portions each intervene between the side plate and the elastic rubber mounting portion so as to elastically connect the paired side plates and the elastic rubber mounting portion. The elastic rubber connection portion is fixedly attached to upper portions of the paired side plates in such a manner as to extend between the side plates. The muffler hanger is supported on a vehicle body by means of a first support shaft member fixedly fitted into a pair of first mounting holes formed in corresponding end portions of the side plates in such a manner as to face each other, and supports the exhaust pipe by means of a second support shaft member which is fixedly fitted into a second mounting hole formed in the elastic rubber mounting portion and which extends in the direction perpendicular to the first support shaft member.

6 Claims, 5 Drawing Sheets

Prior Art

Fig. 10

MUFFLER HANGER

BACKGROUND OF THE INVENTION

1. Field of the Invention

The present invention relates to a muffler hanger used to elastically support an exhaust pipe of a vehicle on the vehicle body.

2. Description of the Related Art

A conventionally known muffler hanger is an annular member which is formed of an elastic rubber member only and in which a pair of mounting holes are formed at two opposed positions in such a manner as to extend horizontally in parallel with each other as disclosed in, for example, Japanese Utility Model Application Laid-Open (kokai) Nos. S64-44318 and H02-35921. The muffler hanger is disposed while being oriented in the front-and-rear direction of the vehicle. A pair of support shaft members are inserted into the corresponding upper and lower mounting holes so as to connect the muffler hanger to the vehicle and to an exhaust pipe, whereby the muffler hanger elastically supports the exhaust pipe on the vehicle body. In this muffler hanger, vibrations of the exhaust pipe in the right-and-left direction of the vehicle cause the muffler hanger to swing in the right-and-left direction about the upper support shaft member. As a result, the spring ratio between the spring stiffness of the muffler hanger in the vertical direction of the vehicle and that in the right-and-left direction is, for example, 1:0.2, indicating that the muffler hanger exhibits a very low spring stiffness in the right-and-left direction as compared with the vertical direction. Thus, this muffler hanger fails to sufficiently damp vibrations of the exhaust pipe in the right-and-left direction.

Another known muffler hanger is an annular member which is formed of an elastic rubber member only and in which a pair of mounting holes are formed at two opposed positions in such a manner as to extend in mutually perpendicular directions as disclosed in, for example, Japanese Utility Model Application Laid-Open (kokai) No. H02-143324. In this muffler hanger, since the paired mounting holes extend in mutually perpendicular directions, even when the exhaust pipe vibrates in the right-and-left direction of the vehicle, the muffler hanger swings rightward and leftward about the upper support shaft member in a smaller amount as compared with the case of the above-mentioned muffler hanger, in which the paired mounding holes extend in parallel with each other. However, in this muffler hanger, a portion of the elastic rubber member which connects the upper and lower mounting holes undergoes mainly shear deformation, indicating that the muffler hanger exhibits a low spring stiffness in the right-and-left direction as compared with the vertical direction of the vehicle. Further, in the above-mentioned two kinds of muffler hangers, when a considerably great rebound force is imposed thereon, the elastic rubber member may break, potentially resulting in dropping off of the exhaust pipe.

Figure 10:
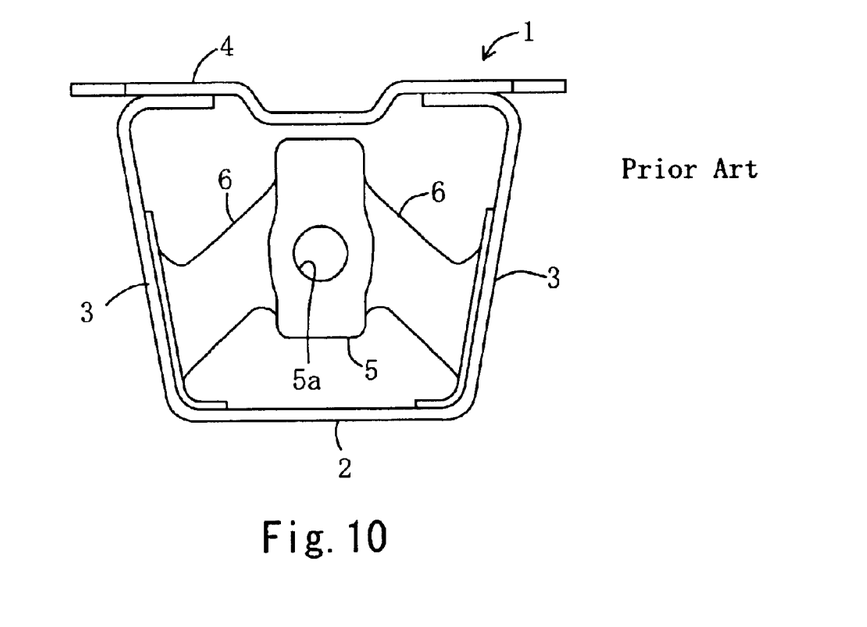
FIG. 10 is a schematic front view of a conventional muffler hanger.

A muffler hanger designed to cope with the above-mentioned problem is disclosed in, for example, Japanese Patent Application Laid-Open (kokai) Nos. H06-93852 and 2001-328441. As shown in FIG. 10, this muffler hanger includes a generally rectangular metallic body member 1, an elastic rubber mounting portion 5, and a pair of elastic rubber supporting portions 6. The metallic body member 1 includes a bottom plate 2 and a pair of side plates 3, which form a shape resembling the letter U, and a mounting plate 4 fixedly attached to the ends of the side plates 3 and projecting outward from the side plates 3. The elastic rubber mounting portion 5 is disposed within the metallic body member 1 and has a mounting hole 5a formed therein in such a manner as to extend in parallel with the walls of the metallic body member 1. Each of the paired elastic rubber supporting portions 6 intervenes between the side plate 3 and the elastic rubber mounting portion 5 so as to elastically connect the side plate 3 and the elastic rubber mounting portion 5. This muffler hanger is mounted to a vehicle body by means of the mounting plate 4 of the metallic body member 1 while being oriented in the front-and-rear direction of the vehicle. An exhaust pipe is supported by a support shaft member fixedly inserted into the mounting hole 5a formed in the elastic rubber mounting portion 5.

Since the elastic rubber mounting portion 5 and the elastic rubber supporting portions 6 are surrounded by the metallic body member 1, even when vibrations of the exhaust pipe in the right-and-left direction are imposed on the muffler hanger, the muffler hanger does not swing in the right-and-left direction. Also, since the elastic rubber mounting portion 5 and the elastic rubber supporting portions 6 are supported by the metallic body member 1 while being enclosed within the metallic body member 1, the spring stiffness of the muffler hanger in the right-and-left direction is higher than the spring stiffness in the vertical direction. As a result, the muffler hanger can sufficiently damp vibrations in the right-and-left direction as well as vibrations in the vertical direction. Further, even when the elastic rubber member breaks as a result of imposition of an excessively large rebound force on the muffler hanger, the exhaust pipe does not drop off the vehicle body, since the support shaft member is caught by the metallic body member 1.

However, in the case of the muffler hanger including the above-mentioned metallic shell 1, since the mounting plate 4 of the metallic body member 1 is mounted to a frame of the vehicle body by use of two bolts, the cost of mounting work and the cost of parts increase as compared with the case of the above-mentioned muffler hangers formed from rubber only. Also, since the mounting plate 4 of this muffler hanger occupies a rather wide area on the vehicle body, the muffler hanger encounters a restriction related to mounting space.

SUMMARY OF THE INVENTION

An object of the present invention is to solve the above-mentioned problems and to provide a muffler hanger in which the spring stiffness thereof in the right-and-left direction is higher than the spring stiffness in the vertical direction, which is less susceptible to a layout restriction related to mounting on a vehicle body, and which is inexpensive.

To achieve the above object, the present invention provides a muffler hanger comprising a metallic body member, a tubular elastic rubber mounting portion, and a pair of elastic rubber supporting portions. The metallic body member comprises a bottom plate and a pair of side plates standing at opposite ends of the bottom plate in a facing condition. The bottom plate and the paired side plates form a generally U-like shape. A pair of first mounting holes are formed in the corresponding paired side plates at end portions of the side plates in such a manner as to face each other. The metallic body member is connected to one of a vehicle body and an exhaust pipe by means of a first support shaft member to be fixedly fitted into the paired first mounting holes. The tubular elastic rubber mounting portion is disposed within the metallic body member and in a space located between the bottom plate and the paired first mounting holes, has a second mounting hole formed therein in such a manner as to extend in the direction perpendicular to the first support shaft member, and is connected to the other of the vehicle body and the exhaust pipe by means of a second support shaft member to be fixedly fitted into the second mounting hole. The paired elastic rubber supporting portions each intervene between the side plate and the elastic rubber mounting portion so as to elastically connect the paired side plates and the elastic rubber mounting portion.

According to the present invention, the muffler hanger is disposed while being oriented in the front-and-rear direction of the vehicle, and is connected to the vehicle body and to the exhaust pipe by means of the first support shaft member fixedly attached to the metallic body member and the second support shaft member fixedly attached to the elastic rubber mounting portion and extending in the direction perpendicular to the first support shaft member. Further, the elastic rubber mounting portion and the elastic rubber supporting portions are enclosed and held by the metallic body member. Thus, when vibrations of the exhaust pipe in the right-and-left direction are imposed on the muffler hanger, the muffler hanger does not swing in the right-and-left direction and maintains its outer shape; i.e., the spring stiffness of the muffler hanger in the right-and-left direction of the vehicle is higher than the spring stiffness in the vertical direction. Therefore, the muffler hanger can sufficiently damp vibrations transmitted from the exhaust pipe; specifically, vibrations in the right-and-left direction as well as vibrations in the vertical direction. Even when the elastic rubber member breaks as a result of imposition of an excessively large rebound force on the muffler hanger, the first support shaft member and the second support shaft member are caught by each other via the metallic body member, thereby preventing the exhaust pipe from dropping off the vehicle body. Further, since the muffler hanger is mounted to a vehicle body frame by means of the first or second support shaft member, the cost of mounting work and that of mounting parts are low as compared with the case of a conventional muffler hanger which is bolted to the vehicle body frame; and the muffler hanger hardly encounters a space restriction related to mounting on the vehicle body.

Preferably, the muffler hanger further comprises an elastic rubber connection portion. The elastic rubber connection portion is disposed between the paired side plates, and comprises a pair of tubular parts and a connection part. The pair of tubular parts are fixed to peripheral portions of the first mounting holes, including wall surfaces thereof, and extend inward. The connection part integrally connects the tubular parts at least on a side toward the elastic rubber supporting portions.

Since the tubular parts of the elastic rubber connection portion are fixed to peripheral portions (including wall surfaces) of the first mounting holes, thereof, and extend inward, the first support shaft member can be readily fitted into the first mounting holes by press-fitting the first support shaft member into the tubular parts, whereby the first support shaft member is reliably fitted into the first mounting holes in a fixed condition. Also, since the elastic rubber connection portion includes the connection part provided at least on the side toward the elastic rubber supporting portions, even when an excessively large rebound force is imposed on the elastic rubber mounting portion, the connection part serves as a stopper for suppressing excessive movement of the elastic rubber supporting portions.

Preferably, the paired elastic rubber supporting portions extend from the paired side plates to the elastic rubber mounting portion while being inclined away from or toward the bottom plate and are integrally joined to opposite side walls of the elastic rubber mounting portion. Thus, while the muffler hanger is connected to the vehicle body and to the exhaust pipe, the elastic rubber supporting portions are appropriately compression-deformed.

The present invention provides another muffler hanger comprising a metallic body member, a tubular first elastic rubber mounting portion, a pair of elastic rubber supporting portions, and a second elastic rubber mounting portion. The metallic body member comprises a bottom plate and a pair of side plates standing at opposite ends of the bottom plate in a facing condition. The bottom plate and the paired side plates form a generally U-like shape. The tubular first elastic rubber mounting portion is disposed within the metallic body member, has a first mounting hole formed therein in such a manner as to extend in parallel with the inner surface of the metallic body member, and is connected to one of a vehicle body and an exhaust pipe by means of a first support shaft member to be fixedly fitted into the first mounting hole. The paired elastic rubber supporting portions each intervene between the side plate and the first elastic rubber mounting portion so as to elastically connect the paired side plates and the first elastic rubber mounting portion. The second elastic rubber mounting portion is fixedly attached to the outer surface of the bottom plate, has a second mounting hole formed therein in such a manner as to extend in the direction perpendicular to the first mounting hole, and is connected to the other of the vehicle body and the exhaust pipe by means of a second support shaft member to be fixedly fitted into the second mounting hole.

According to the present invention, the muffler hanger is disposed while being oriented in the front-and-rear direction of the vehicle, and is connected to the vehicle body and to the exhaust pipe by means of the first support shaft member and the second support shaft member which are fixedly fitted into the first mounting hole and the second mounting hole, respectively, located on opposite sides of the metallic body member and which extend in the mutually perpendicular directions. Further, the first elastic rubber mounting portion and the elastic rubber supporting portions are enclosed and held by the metallic body member. Thus, when vibrations of the exhaust pipe in the right-and-left direction are imposed on the muffler hanger, the muffler hanger does not swing in the right-and-left direction and maintains its outer shape; i.e., the spring stiffness of the muffler hanger in the right-and-left direction of the vehicle is higher than the spring stiffness in the vertical direction. Therefore, the muffler hanger can sufficiently damp vibrations transmitted from the exhaust pipe; specifically, vibrations in the right-and-left direction as well as vibrations in the vertical direction. Also, since the muffler hanger is mounted to a vehicle body frame by means of the first or second support shaft member, the cost of mounting work and that of mounting parts are low as compared with the case of a conventional muffler hanger which is bolted to the vehicle body frame; and the muffler hanger hardly encounters a space restriction related to mounting on the vehicle body.

Preferably, the paired elastic rubber supporting portions extend from the paired side plates to the first elastic rubber mounting portion while being inclined away from or toward the bottom plate and are integrally joined to opposite side walls of the first elastic rubber mounting portion. Thus, while the muffler hanger is connected to the vehicle body and to the exhaust pipe, the elastic rubber supporting portions are appropriately compression-deformed.

Preferably, the paired side plates are inclined outward, and the paired elastic rubber supporting portions extend from the paired side plates to the first elastic rubber mounting portion while being inclined away from the bottom plate and are integrally joined to opposite side walls of the first elastic rubber mounting portion. Thus, while the muffler hanger is connected to the vehicle body and to the exhaust pipe, the elastic rubber supporting portions are appropriately compression-deformed, and the outwardly inclined side plates appropriately receive the compression deformation of the elastic rubber supporting portions.

DESCRIPTION OF THE PREFERRED EMBODIMENTS

Figure 1:
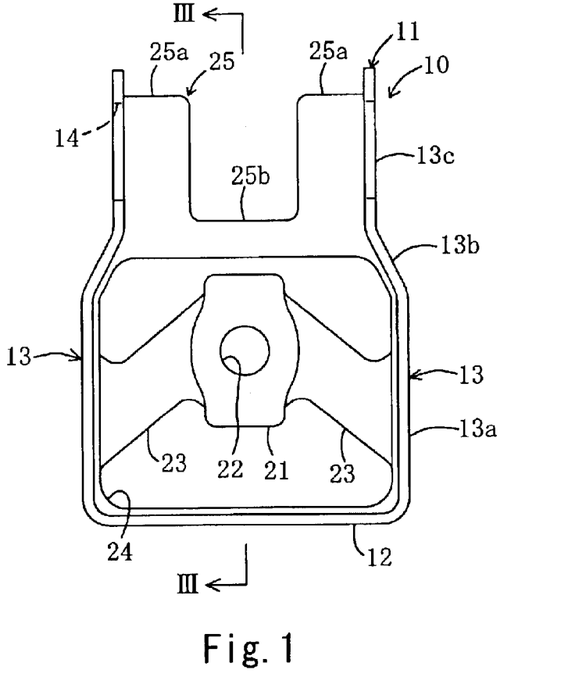
FIG. 1 is a schematic front view of a muffler hanger according to a first embodiment of the present invention.
Figure 2:
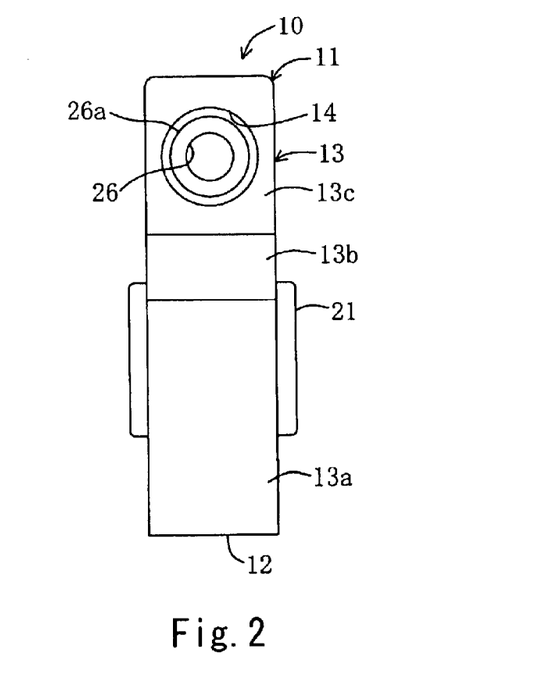
FIG. 2 is a schematic side view of the muffler hanger of FIG. 1.
Figure 3:
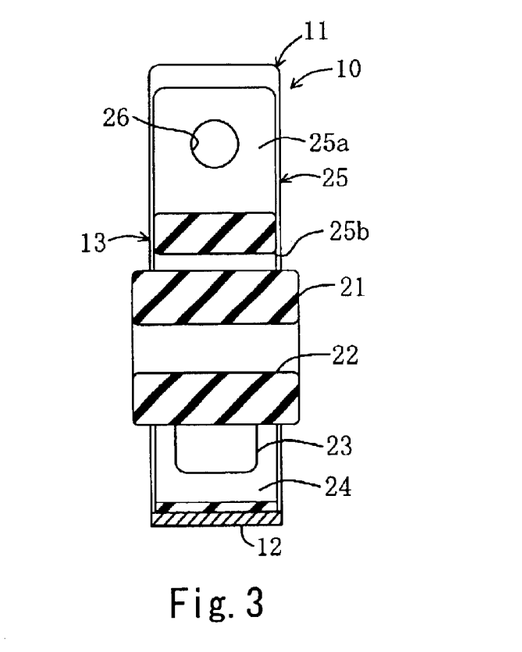
FIG. 3 is a sectional view of the muffler hanger of FIG. 1 taken along line III—III of FIG. 1.
Figure 4:
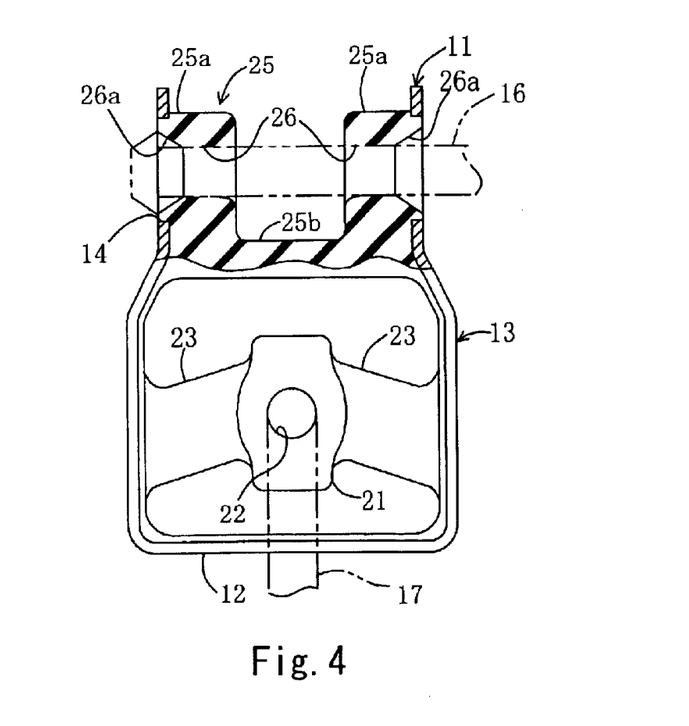
FIG. 4 is a partially sectioned front view schematically showing a state in which the muffler hanger of FIG. 1 is in use.

Embodiments of the present invention will next be described in detail with reference to the drawings. FIGS. 1 to 3 show a muffler hanger 10 according to a first embodiment of the present invention and adapted to support an exhaust pipe on a vehicle body frame, by means of a front view, a side view, and a sectional view taken along line III—III of FIG. 1. FIG. 4 schematically shows a state of mounting the muffler hanger 10 on a vehicle by means of a partially sectioned front view.

The muffler hanger 10 includes a metallic body member 11, an elastic rubber mounting portion 21, a pair of elastic rubber supporting portions 23, and an elastic rubber connection portion 25. The metallic body member 11 includes a bottom plate 12 and a pair of side plates 13 and assumes a generally U-like shape. The elastic rubber mounting portion 21 is disposed within the metallic body member 11. The paired elastic rubber supporting portions 23 each intervene between the side plate 13 and the elastic rubber mounting portion 21 so as to elastically connect the paired side plates 13 and the elastic rubber mounting portion 21. The elastic rubber connection portion 25 is fixedly attached to upper portions of the paired side plates 13 in such a manner as to extend between the side plates 13. The muffler hanger 10 is supported on a vehicle body by means of a first support shaft member 16 fixedly fitted into a pair of first mounting holes 14 formed in corresponding end portions of the side plates in such a manner as to face each other, and supports the exhaust pipe by means of a second support shaft member 17 fixedly fitted into a second mounting hole 22 formed in the elastic rubber mounting portion 21 and extending in the direction perpendicular to the paired first mounting holes 14. Notably, upside and downside, and right side and left side in FIG. 1 and near side and far side with respect to the plane of the paper of FIG. 1 correspond to the upside and downside, the right side and left side, and the front side and rear side of a vehicle as viewed when the muffler hanger 10 is mounted on the vehicle.

The metallic body member 11 is formed by bending an elongated metal plate of a predetermined width so as to form the rectangular bottom plate 12 and the paired side plates 13 standing upright at longitudinally opposite ends of the bottom plate 12 in a mutually facing condition. Each of the side plates 13 has an inclined portion 13b, which is slightly inclined inward at a substantially central position of the side plate 13 along the longitudinal direction of the side plate 13, and includes a lower-plate portion 13a and an upper-plate portion 13c, which extend downward and upward, respectively, from the inclined portion 13b in parallel with each other. The first mounting hole 14 is formed in each of the paired upper-plate portions 13 at the center position.

The elastic rubber mounting portion 21 generally assumes a shape of an vertically elongated rectangular parallelepiped and is disposed at the center position between the paired side plates 13 to be located at a vertical position corresponding to upper end parts of the lower-plate portions 13a. Front and rear end portions of the elastic rubber mounting portion 21 slightly project from the front and rear ends of the metallic body member 11. The elastic rubber mounting portion 21 has the second mounting hole 22 formed therein at the center position in such a manner as to extend therethrough in the front-and-rear direction. The paired elastic rubber supporting portions 23 extend obliquely upward from corresponding lower half parts of the lower-plate portions 13a of the paired side plates 13 and are joined to the right and left side walls of the elastic rubber mounting portion 21, whereby the paired elastic rubber supporting portions 23 are compression-deformed upon subjection to stress imposed from above.

The elastic rubber connection portion 25 is disposed between the paired side plates 13 and includes a pair of tubular parts 25a and a connection part 25b. Each of the paired tubular parts 25a is fixed to a peripheral portion of the first mounting hole 14, including inner wall thereof, and extends inward; i.e., toward the opposite side plate 13. The connection part 25b extends between the tubular parts 25a so as to connect the tubular parts 25a in regions located on the side toward the elastic rubber supporting portions 23. The paired tubular parts 25a and the connection part 25b form a generally U-like shape. The elastic rubber connection portion 25 is fixedly attached to the inclined portions 13b and the upper-plate portions 13c in areas extending upward from vertically central positions of the inclined portions 13b of the paired side plates 13. Each of the tubular parts 25a covers the wall surface of the first mounting hole 14 formed in the upper-plate portion 13c and has a through-hole 26 formed therein, which is coaxial with the first mounting hole 14 and has a diameter smaller than that of the first mounting hole 14. The outer end portion of each of the through-holes 26 is conically widened toward the side wall of the upper-plate portion 13c, thereby forming a fanned portion 26a. The fanned portions 26a facilitate press-fitting of the first support shaft member 16 into the through-holes 26. The elastic rubber connection portion 25 may assume a structure other than the generally U-like shape. For example, the elastic rubber connection portion 25 may assume a tubular structure such that the paired tubular parts 25a are completely connected by the connection part 25b extending therebetween.

A thin-walled rubber coating layer 24 covers the substantially entire inner surface of the metallic body member 11 excluding portions covered with the elastic rubber supporting portions 23 and portions covered with the elastic rubber connection portion 25. The elastic rubber mounting portion 21, the elastic rubber supporting portions 23, the elastic rubber connection portion 25, and the rubber coating layer 24 are formed integrally with the metallic body member 11 through rubber vulcanization molding, in which high-temperature rubber material is injected into a mold in which the metallic body member 11 is set in place. Thus is formed the muffler hanger 10.

As shown in FIG. 4, the first support shaft member 16 fixedly attached to a vehicle body frame is press-fitted into the paired through-holes 26 formed in the elastic rubber connection portion 25 to thereby be fixedly fitted in the paired first mounting holes 14, whereby the muffler hanger 10 is supported on the vehicle body frame. Further, the second support shaft member 17 is press-fitted into the second mounting hole 22 formed in the elastic rubber mounting portion 21, whereby the muffler hanger 10 supports an exhaust pipe to thereby elastically support the exhaust pipe on the vehicle body. In the thus-mounted state, the elastic rubber supporting portions 23 are compression-deformed downward as a result of subjection to stress exerted from the exhaust pipe; thus, the elastic rubber mounting portion 21 is disposed at a central position between the bottom plate 12 and the elastic rubber connection portion 25.

The muffler hanger 10 according to the thus-configured embodiment is disposed while being oriented in the front-and-rear direction of a vehicle, and is connected to the vehicle body and to the exhaust pipe by means of the first support shaft member 16 fixedly attached to the metallic body member 11 and the second support shaft member 17 fixedly attached to the elastic rubber mounting portion 21 and extending in the direction perpendicular to the first support shaft member 16. Further, the elastic rubber mounting portion 21 and the elastic rubber supporting portions 23 are enclosed and held by the metallic body member 11. Thus, when vibrations of the exhaust pipe in the right-and-left direction are imposed on the muffler hanger 10, the muffler hanger 10 does not swing in the right-and-left direction and maintains its outer shape; i.e., the spring stiffness of the muffler hanger 10 in the right-and-left direction of the vehicle is higher than the spring stiffness in the vertical direction. Therefore, the muffler hanger 10 can sufficiently damp vibrations transmitted from the exhaust pipe; specifically, vibrations in the right-and-left direction as well as vibrations in the vertical direction.

Even when the elastic rubber member breaks as a result of imposition of an excessively large rebound force on the muffler hanger 10, the first support shaft member 16 and the second support shaft member 17 are caught by each other via the metallic body member 11, thereby preventing the exhaust pipe from dropping off the vehicle. Further, since the muffler hanger 10 is mounted to the vehicle body frame in a simple manner by means of the first support shaft member 16, the cost of mounting work and that of mounting parts are low as compared with the case of a conventional muffler hanger which is bolted to the vehicle body frame; and the muffler hanger 10 hardly encounters a space restriction related to mounting on the vehicle body.

Attachment of the first and second support shaft members 16 and 17 to the muffler hanger 10 may be reversed. Specifically, in place of the above-described embodiment, the muffler hanger 10 is disposed upside down with respect to the disposition of FIG. 1. The first support shaft member 16 fixedly attached to the vehicle body frame is press-fitted into the second mounting hole 22 formed in the elastic rubber mounting portion 21, and the second support shaft member 17 is press-fitted into the through-holes 26 formed in the elastic rubber connection portion 25, whereby the exhaust pipe is supported on the vehicle body by means of the muffler hanger 10. In this case, the elastic rubber supporting portions 23 are appropriately compression-deformed.

In contrast to the embodiment of FIG. 1, the elastic rubber supporting portions 23 of the muffler hanger 10 may extend obliquely downward from corresponding upper half parts of the lower-plate portions 13a to thereby be joined to the elastic rubber mounting portion 21. This configuration enables the following mounting: the first support shaft member 16 fixedly attached to the vehicle body frame is press-fitted into the second mounting hole 22 formed in the elastic rubber mounting portion 21, and the second support shaft member 17 is press-fitted into the through-holes 26 formed in the elastic rubber connection portion 25, whereby the exhaust pipe is supported on the vehicle body by means of the muffler hanger 10. In this case as well, the elastic rubber supporting portions 23 are appropriately compression-deformed.

Figure 5:
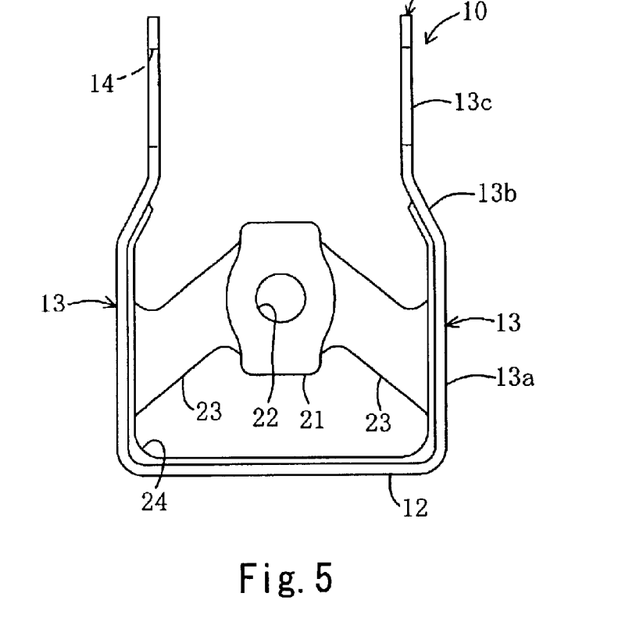
FIG. 5 is a front view of a muffler hanger according to a modification of the first embodiment.

FIG. 5 shows a modification of the first embodiment. As shown in FIG. 5, the elastic rubber connection portion 25 is eliminated. The first support shaft member 16 can be directly attached to the side plates 13 in a fixed condition through, for example, press-fitting into the first mounting holes 14 or crimping.

Next, a second embodiment of the present invention will be described in detail with reference to the drawings.

Figure 6:
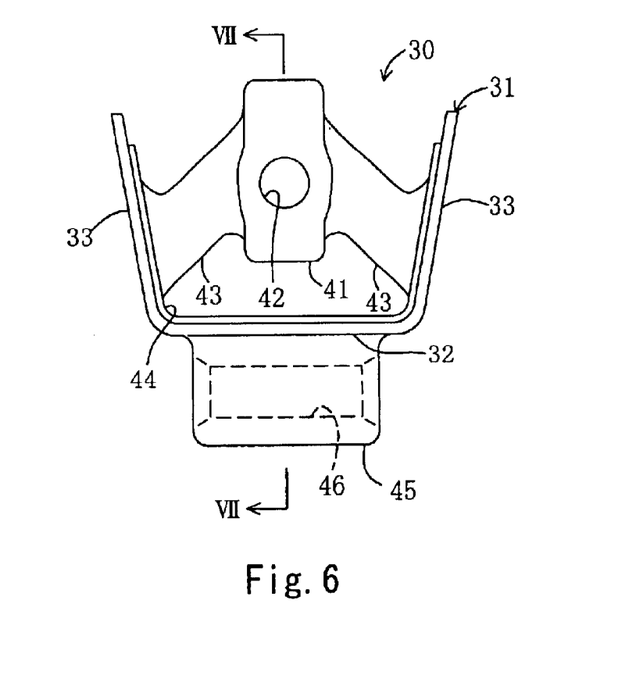
FIG. 6 is a schematic front view of a muffler hanger according to a second embodiment of the present invention.
Figure 7:
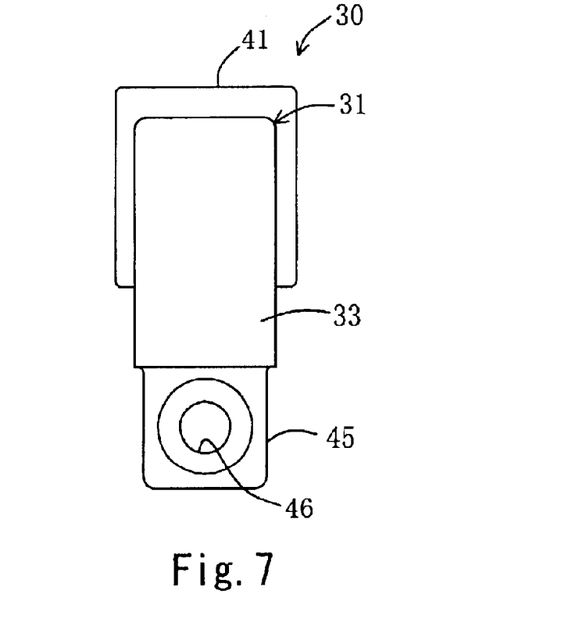
FIG. 7 is a schematic side view of the muffler hanger of FIG. 6.
Figure 8:
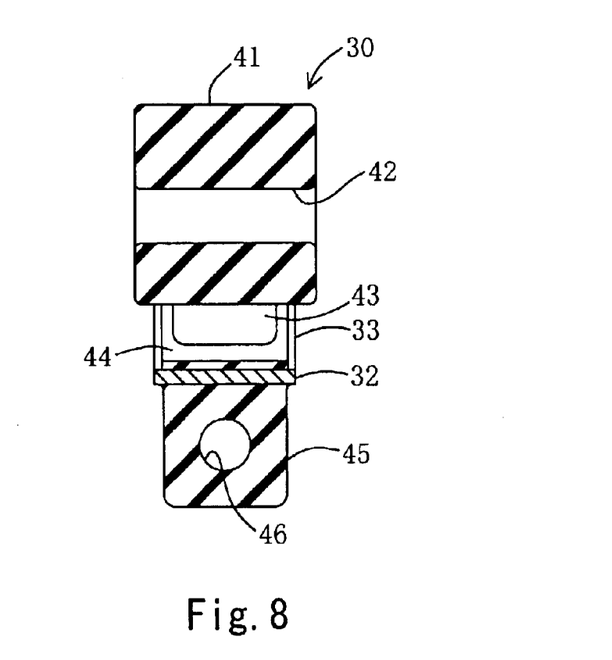
FIG. 8 is a sectional view of the muffler hanger of FIG. 6 taken along line VII—VII of FIG. 6.

As shown in FIGS. 6 to 8, a muffler hanger 30 of the present embodiment includes a metallic body member 31, a first elastic rubber mounting portion 41, a pair of elastic rubber supporting portions 43, and a second elastic rubber mounting portion 45. The metallic body member 31 includes a bottom plate 32 and a pair of side plates 33 and assumes a generally U-like shape. The first elastic rubber mounting portion 41 is disposed within the metallic body member 31 and has a first mounting hole 42 formed therein in such a manner as to extend in parallel with the inner surface of the metallic body member 31. The paired elastic rubber supporting portions 43 each intervene between the side plate 33 and the first elastic rubber mounting portion 41 so as to elastically connect the paired side plates 33 and the first elastic rubber mounting portion 41. The second elastic rubber mounting portion 45 is fixedly attached to the outer surface (the lower surface in FIG. 6) of the bottom plate 32 and has a second mounting hole 46 formed therein in such a manner as to extend in the direction perpendicular to the first mounting hole 42. Notably, upside and downside, and right side and left side in FIG. 6 and near side and far side with respect to the plane of the paper of FIG. 6 correspond to the upside and downside, the right side and left side, and the front side and rear side of a vehicle as viewed when the muffler hanger 30 is mounted on the vehicle.

The metallic body member 31 is formed by bending an elongated metal plate of a predetermined width so as to form the rectangular bottom plate 32 and the paired side plates 33 standing substantially upright at longitudinally opposite ends of the bottom plate 32 in a mutually facing condition while being slightly inclined outward.

The first elastic rubber mounting portion 41 generally assumes a shape of a vertically elongated rectangular parallelepiped and is disposed in the metallic body member 31 at the center position between the paired side plates 33 to be located at a vertical position corresponding to upper end portions of the side plates 33. Front and rear end portions of the first elastic rubber mounting portion 41 slightly project from the front and rear ends of the metallic body member 31. The first elastic rubber mounting portion 41 has the first mounting hole 42 formed therein at the center position in such a manner as to extend therethrough in the front-and-rear direction. The paired elastic rubber supporting portions 43 extend obliquely upward from corresponding lower half portions of the paired side plates 33 and are joined to the right and left side walls of the first elastic rubber mounting portion 41. A thin-walled rubber coating layer 44 covers the substantially entire inner surface of the metallic body member 31 excluding portions covered with the elastic rubber supporting portions 43. The second elastic rubber mounting portion 45 assumes the shape of a rectangular parallelepiped and has the second mounting hole 46 formed therein in such a manner as to extend through a central portion thereof in the direction perpendicular to the first mounting hole 42. The first elastic rubber mounting portion 41, the elastic rubber supporting portions 43, the second elastic rubber mounting portion 45, and the rubber coating layer 44 are formed integrally with the metallic body member 31 through rubber vulcanization molding, in which high-temperature rubber material is injected into a mold in which the metallic body member 31 is set in place. Thus is formed the muffler hanger 30.

A first support shaft member fixedly attached to a vehicle body frame is press-fitted into the second mounting hole 46 formed in the second elastic rubber mounting portion 45, whereby the muffler hanger 30 is supported on the vehicle body frame. Further, a second support shaft member is press-fitted into the first mounting hole 42 formed in the first elastic rubber mounting portion 41, whereby the muffler hanger 30 supports an exhaust pipe to thereby elastically support the exhaust pipe on the vehicle body. In the thus-mounted state, the elastic rubber supporting portions 43 are compression-deformed downward as a result of subjection to stress exerted from the exhaust pipe; thus, the first elastic rubber mounting portion 41 moves toward the bottom plate 12 to a certain extent and is disposed there. Being slightly inclined outward, the side plates 33 appropriately receive the compression deformation of the elastic rubber supporting portions 43.

The muffler hanger 30 according to the thus-configured second embodiment is connected to the vehicle body and to the exhaust pipe via the metallic body member 31 by means of the first and second support shaft members (not shown) which are fixedly fitted into the first mounting hole 42 and the second mounting hole 46 and which extend in the mutually perpendicular directions. Further, the first elastic rubber mounting portion 41 and the elastic rubber supporting portions 43 are enclosed and held by the metallic body member 31. Thus, when vibrations of the vehicle in the right-and-left direction are imposed on the muffler hanger 30, the muffler hanger 30 does not swing in the right-and-left direction and maintains its outer shape; i.e., the spring stiffness of the muffler hanger 30 in the right-and-left direction of the vehicle is higher than the spring stiffness in the vertical direction. Therefore, the muffler hanger 30 can sufficiently damp vibrations transmitted from the exhaust pipe; specifically, vibrations in the right-and-left direction as well as vibrations in the vertical direction. Also, since the muffler hanger 30 is mounted to the vehicle body frame by means of the first support shaft member, the cost of mounting work and that of mounting parts are low as compared with the case of a conventional muffler hanger which is bolted to the vehicle body frame; and the muffler hanger 30 hardly encounters a space restriction related to mounting on the vehicle body.

Attachment of the first and second support shaft members to the muffler hanger 30 may be reversed. Specifically, in place of the above-described embodiment, the muffler hanger 30 is disposed upside down with respect to the disposition of FIG. 6. The first support shaft member fixedly attached to the vehicle body frame is press-fitted into the first mounting hole 42 formed in the first elastic rubber mounting portion 41, and the second support shaft member is press-fitted into the second mounting hole 46 formed in the second elastic rubber mounting portion 45, whereby the exhaust pipe is supported on the vehicle body by means of the muffler hanger 30. In this case, the elastic rubber supporting portions 43 are appropriately compression-deformed.

Next, a modification of the second embodiment will be described with reference to the drawings.

Figure 9:
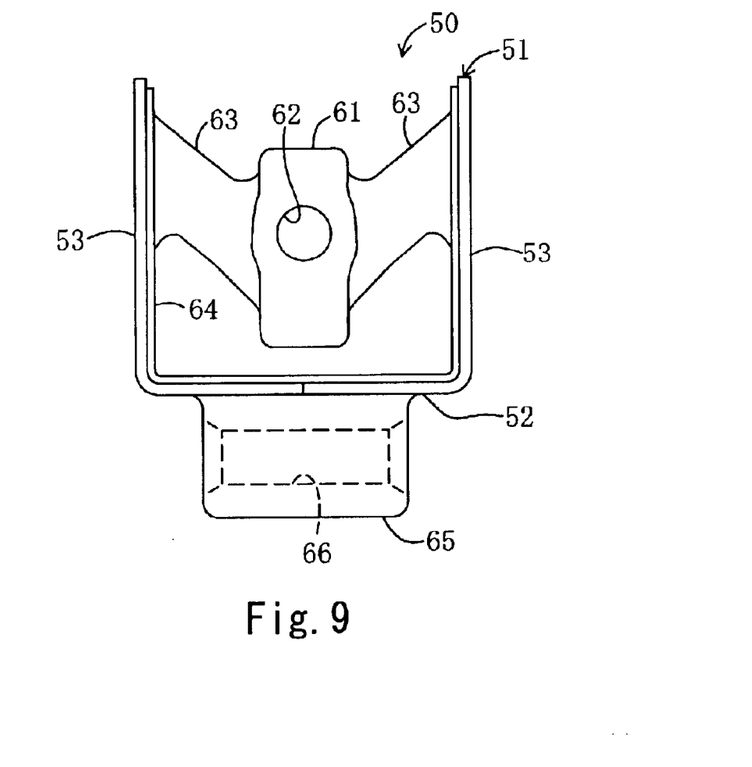
FIG. 9 is a front view of a muffler hanger according to a modification of the second embodiment.

As shown in FIG. 9, a muffler hanger 50 according to the present modification assumes a structure similar to that of the muffler hanger 30 except that a pair of side plates 53 stand perpendicularly to a bottom plate 52 and that a pair of elastic rubber supporting portions 63 extend obliquely downward from corresponding upper half portions of the paired side plates 53 and are joined to the right and left side walls of a first elastic rubber mounting portion 61.

A first support shaft member (not shown) fixedly attached to a vehicle body frame is press-fitted into a first mounting hole 62 formed in the first elastic rubber mounting portion 61, whereby the muffler hanger 50 is supported on the vehicle body frame. Further, a second support shaft member (not shown) is press-fitted into a second mounting hole 66 formed in a second elastic rubber mounting portion 65, whereby the muffler hanger 50 supports an exhaust pipe to thereby elastically support the exhaust pipe on the vehicle body. Thus, the present modification yields effect similar to that yielded by the second embodiment.

Attachment of the first and second support shaft members to the muffler hanger 50 can be reversed by disposing the muffler hanger 50 upside down with respect to the disposition of FIG. 9. The first support shaft member fixedly attached to the vehicle body frame is press-fitted into the second mounting hole 66 formed in the second elastic rubber mounting portion 65 to thereby support the muffler hanger 50 on the vehicle body, and the second support shaft member is press-fitted into the first mounting hole 62 formed in the first elastic rubber mounting portion 61 to thereby support the exhaust pipe, whereby the exhaust pipe is supported on the vehicle body by means of the muffler hanger 50. In this case, the elastic rubber supporting portions 63 are appropriately compression-deformed.

The above-described embodiments are mere examples, and the present invention may be embodied in various other forms without departing from the scope of the invention.

What is claimed is:

1. A muffler hanger comprising:
    a metallic body member comprising a bottom plate and a pair of side plates standing at opposite ends of said bottom plate in a facing condition, said bottom plate and said paired side plates forming a generally U-like shape, a pair of first mounting holes being formed in corresponding end portions of said side plates in such a manner as to face each other, and said metallic body member being connected to one of a vehicle body and an exhaust pipe by means of a first support shaft member being fixedly fitted into said paired first mounting holes;

a tubular elastic rubber mounting portion disposed within said metallic body member and in a space located between said bottom plate and said paired first mounting holes, having a second mounting hole formed therein in such a manner as to extend in a direction perpendicular to said first support shaft member, and being connected to the other of said vehicle body and said exhaust pipe by means of a second support shaft member being fixedly fitted into said second mounting hole; and a pair of elastic rubber supporting portions each intervening between said side plate and said elastic rubber mounting portion so as to elastically connect said paired side plates and said elastic rubber mounting portion.

2. A muffler hanger according to claim 1, further comprising an elastic rubber connection portion, which is disposed between said paired side plates and which comprises a pair of tubular parts fixed to peripheral portions, including wall surfaces, of said first mounting holes and extending inward; and a connection part for integrally connecting said tubular parts at least on a side toward said elastic rubber supporting portions.

3. A muffler hanger according to claim 1, wherein said paired elastic rubber supporting portions extend from said paired side plates to said elastic rubber mounting portion while being inclined away from or toward said bottom plate and are integrally joined to opposite side walls of said elastic rubber mounting portion.

4. A muffler hanger comprising:

a metallic body member comprising a bottom plate and a pair of side plates standing at opposite ends of said bottom plate in a facing condition, said bottom plate and said paired side plates forming a generally U-like shape;

a tubular first elastic rubber mounting portion disposed within said metallic body member, having a first mounting hole formed therein in such a manner as to extend in parallel with an inner surface of said metallic body member, and being connected to one of a vehicle body and an exhaust pipe by means of a first support shaft member being fixedly fitted into said first mounting hole;

a pair of elastic rubber supporting portions each intervening between said side plate and said first elastic rubber mounting portion so as to elastically connect said paired side plates and said first elastic rubber mounting portion; and a second elastic rubber mounting portion fixedly attached to an outer surface of said bottom plate, having a second mounting hole formed therein in such a manner as to extend in a direction perpendicular to said first mounting hole, and being connected to the other of said vehicle body and said exhaust pipe by means of a second support shaft member being fixedly fitted into said second mounting hole.

5. A muffler hanger according to claim 4, wherein said paired elastic rubber supporting portions extend from said paired side plates to said first elastic rubber mounting portion while being inclined away from or toward said bottom plate and are integrally joined to opposite side walls of said first elastic rubber mounting portion.

6. A muffler hanger according to claim 4, wherein said paired side plates are inclined outward, and said paired elastic rubber supporting portions extend from said paired side plates to said first elastic rubber mounting portion while being inclined away from said bottom plate and are integrally joined to opposite side walls of said first elastic rubber mounting portion.

* * * * *